(12) United States Patent
Li et al.

(10) Patent No.: US 9,762,573 B2
(45) Date of Patent: Sep. 12, 2017

(54) BIOMETRIC FRAMEWORK ALLOWING INDEPENDENT APPLICATION CONTROL

(71) Applicant: Verizon Patent and Licensing Inc., Arlington, VA (US)

(72) Inventors: Yuk Lun Li, Morganville, NJ (US); Young Rak Choi, Belle Mead, NJ (US); Mauricio Pati Caldeira de Andrada, South Plainfield, NJ (US); Jeremy Nacer, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 14/292,287

(22) Filed: May 30, 2014

(65) Prior Publication Data
US 2015/0350200 A1    Dec. 3, 2015

(51) Int. Cl.
*G06F 21/00*    (2013.01)
*H04L 29/06*    (2006.01)
*H04W 12/06*    (2009.01)
*H04W 88/02*    (2009.01)

(52) U.S. Cl.
CPC ......... *H04L 63/0861* (2013.01); *H04W 12/06* (2013.01); *H04W 88/02* (2013.01)

(58) Field of Classification Search
CPC .......... H04L 63/0861; H04L 63/0815; H04W 12/06; H04W 88/02
USPC .................................................. 713/172, 186
See application file for complete search history.

(56) References Cited

U.S. PATENT DOCUMENTS 9,161,325 B1 *    10/2015    Urbanek ............... H04W 4/001
2010/0237991 A1 *    9/2010    Prabhu ................ G06F 3/03547
340/5.83

* cited by examiner

*Primary Examiner* — Kambiz Zand
*Assistant Examiner* — Suman Debnath

(57) ABSTRACT

Generation and segregation of mobile device biometric application template storage is described. Applications request a memory domain within mobile device storage for storing enrolled templates in the domain. The application calls a secure API associated with the biometric driver and software of the mobile device. As a result, the biometric driver and software does not search a number of domains to locate the enrolled templates that correspond to the mobile application or search all enrolled templates stored in memory. The mobile device applications maintain control of the storage domain and the template. The enrolled template may only be deleted through the controlling mobile device application.

20 Claims, 6 Drawing Sheets

100

BIOMETRIC FRAMEWORK ALLOWING INDEPENDENT APPLICATION CONTROL

BACKGROUND

Today, there are several solutions available for user authentication on mobile devices. These solutions vary in the nature of how users are authenticated. Some use password for authentication, while others use pattern, biometric or facial recognition.

These solutions vary in the context of how the users are authenticated. The user authentication occurs either at the device level or at the application level. Device level authentication authenticates whether a user is a valid user of a mobile device thereby establishing ownership. Application level authentication, on the other hand, authenticates whether a user is a valid user of an identified one of the applications installed on the mobile device.

Typically, application level authentication requires the user to enter a password every time the application is started. This type of authentication presents limitations in terms of usability as well as security. For instance, users need to enter a password manually on mobile devices that usually have a small screen size. In addition, password authentication also presents security limitations as the application needs to store the password somewhere on the mobile device for verification.

Biometric sensors are beginning to appear on mobile devices. An example of a biometric sensor is an imaging sensor, such as a camera-based fingerprint sensor, that collects external information and constructs an image of a fingerprint, face or object. Other examples of biometric sensors include capacitive sensors, optical sensors, thermal sensors, pressure sensors, radio frequency sensors, and ultrasonic sensors. The use of biometrics to access a mobile device may be increasing. The currently used software, however, is based on an outdated software architecture.

In this outdated software architecture, any applications that use the biometric service provided by an equipment manufacturer are using an application programming interface (API) that is proprietary to the equipment manufacturer to access the biometric sensing technology on the device. As a result, a user's enrollment with the biometric service and deletion of any template made during the enrollment is controlled by the system software of the equipment manufacturer. While applications can request that the biometric service examine enrolled templates for a match to an inputted biometric, the application has little control over the management of the enrolled templates and the biometric matching service. The problems with this architecture include 1) only the equipment manufacturer system controls the template management; 2) the application does not control deletion of the templates; and 3) if the number of templates are large, and a biometric request is made, the matching may take some time to go through all of the enrolled templates stored in the device memory.

Furthermore, the outdated software architecture assumes that the mobile device is a single user device, only receives control signals from system control (i.e., not application based), and has a single area of memory for enrolled template storage. This architecture was sufficient in the past when devices were simpler and applications were integrated into the mobile device software. Such an architecture is also sufficient for devices that have full control of the mobile device system and that have only a handful of applications available for use, and not to any other application. Many advanced devices do not and will not in the future fit these limitations.

As a result, a need exists for biometric-enabled applications to provide some control inputs to the biometric system and to manage the enrollment of templates including allowing deletion of enrolled templates, and limiting the number of templates to be examined during matching.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
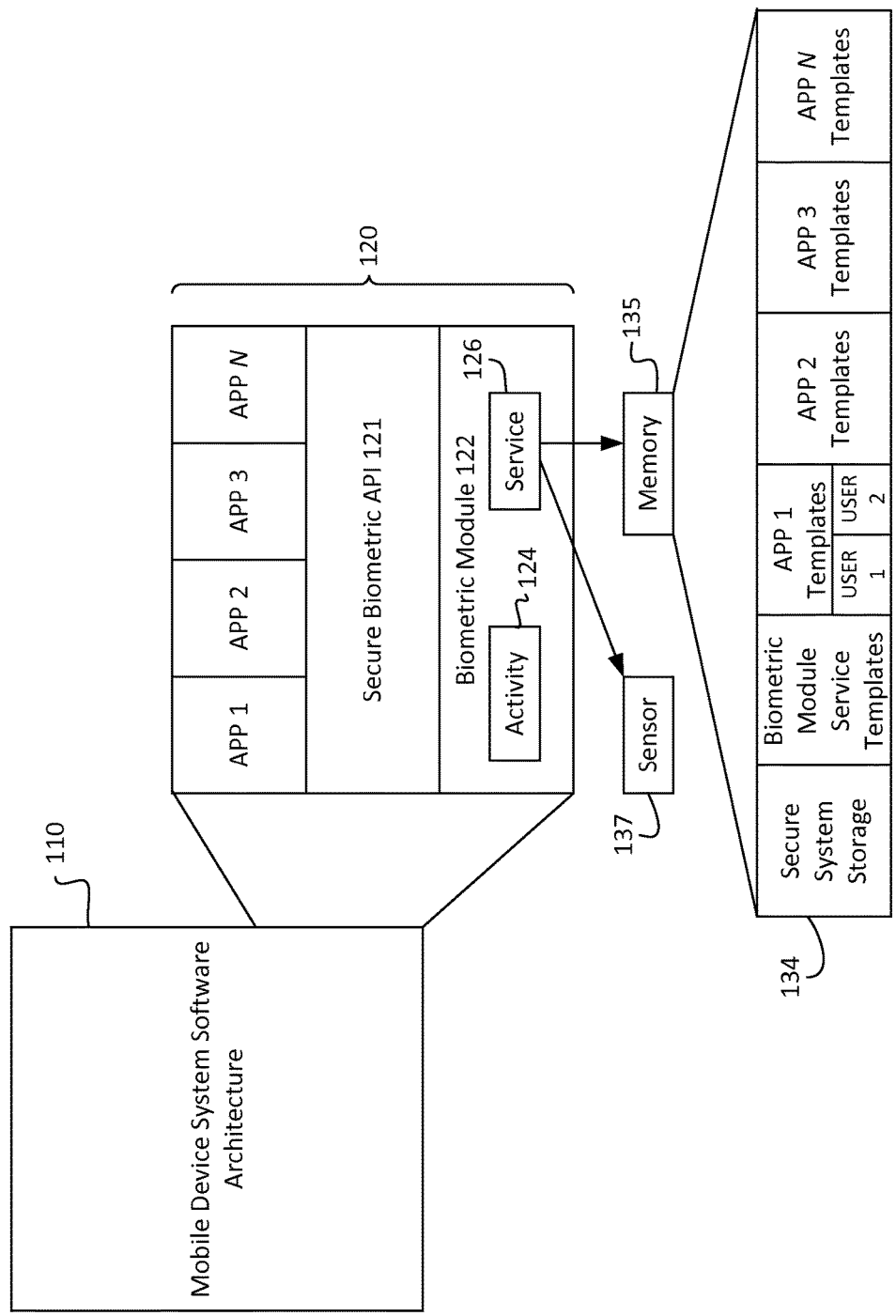
FIG. 1 is a high-level functional block diagram of an example of a mobile device system software architecture, when executed by a mobile device processor(s), that supports an example of a secure biometric service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Throughout the disclosure, a number of terms will be used in the description of the various examples. For example, a biometric sensor detects a biometric input of a user. In the following examples, the biometric and biometric sensor that will be referred to most frequently is a fingerprint and a fingerprint sensor. Of course, other types of biometrics (e.g., face, retina, palm, voice and the like) and other biometric sensors (e.g., camera, microphone and the like as well as any associated processors for processing the detected biometric) may be used. With regard to the biometric processing, a template is a collection of reference points obtained from a fingerprint image (or other detected representation of a fingerprint) and contains relevant and unique information, such as derived from images of the fingerprint. The process of generating an initial template for later comparison is referred to as enrollment. Enrollment may be defined as a process in which an image of an authorized user's fingerprint is captured via the same or similar biometric sensor, converted to a template, and stored as a reference template, or enrollment template. In other words, the enrollment template is considered the standard reference point pattern or representation that is considered unique to the specific user that input the biometric. The other forms of biometric identifiers (e.g., retina, face or voice), if used, are also subject to an enrollment process.

In addition, computer related functions will be described with reference to certain terms. For example, an application programming interface (API) is described. In general, an API may include one or more rules and/or specifications that a software program (e.g., provided in one system) can follow to access and make use of services and/or resources provided by another particular software program (e.g., provided in another system) that implements the API. The API may serve as an interface between different software programs (e.g., provided in different systems), and may facilitate interaction of the different software programs. The API may be created for applications, libraries, operating systems, etc., as a way to define "vocabularies" and resources/or request conventions (e.g., function-calling conventions). The API may include specifications for routines, data structures, object classes, and/or protocols used to communicate between different systems (e.g., an application and a service provided by an OEM device. For example, the API may provide a set of computer procedure calls that enable an application external (or internal) to a mobile device to exchange control commands and data with functions on the mobile device.

The biometric services, such as a device unlock or payment services, provided by the OEM device are not downloaded from an online store or from an OEM website. The biometric services of the OEM device may present a common interface controlled by the OEM device system (e.g., by the BIOS or the operating system) and may allow enrollment of a number of biometrics (e.g., fingerprints) up to the provided OEM biometric services system limit for storing enrollment templates (e.g. 20-30 enrolled templates) that exist. References will be made to a memory that is partitionable into multiple domains. The partitionable memory may be partitioned under control of a secured, biometric-enabled application via a secure API. At least one of the multiple domains is a part of a template database that is allocated to the respective application.

The various examples disclosed herein relate to a mobile device biometric service that partitions the biometric template storage on the device into various memory domains that may be specific to a single mobile device application. In addition, each mobile application may request that a memory domain specific to the mobile application be created when the biometric service is called by a calling application. The request for the creation of a specific mobile application memory domain may be made, for example, when the mobile application requests enrollment of a biometric input. During the enrollment of the biometric input, the enrolled templates may be stored in the created memory domain. In addition, the biometric service allows the mobile device application to have exclusive control of the creation and deletion of the enrolled templates. This eliminates the condition where a first application can delete a template enrolled by a second application, which is an advantage of the presently disclosed examples. Another advantage of allowing the application to have exclusive control of the mobile application memory domain is that any search initiated by one mobile device application may be limited to only the one mobile device application's own individual memory domain, thus reducing the time required to perform template matches. Additionally, the mobile device application may limit the number of templates from the mobile device application's own memory domain that are to be searched.

Reference now is made in detail to the examples illustrated in the accompanying drawings and discussed below.

FIG. 1 is a high-level functional block diagram of an example of a mobile device system software architecture executed by a mobile device processor(s). The software architecture is an example of a secure biometric service.

One or more mobile device processors (not shown) implement a system 100 of various functions in response to programming instructions maintained in the mobile device system software architecture 110. Of particular interest in the following discussion is the secure biometric control system 120.

The mobile device secure biometric control system 120 may be implemented via a number of different layers of the mobile device system software architecture 110. The secure biometric control system 120 software architecture may include a number of secure biometric mobile device applications, App 1, App 2, App 3 to App N, a secure biometric API 121, and a biometric module 122. The biometric module 122 may include a biometric activity 124 and a biometric service 126, both of which are described in further detail below.

The secure biometric mobile device applications App 1-App N may be any type of mobile device application that utilizes biometrics as an input. Depending upon the level of security desired by the application and/or the application user, different biometric functions may be provided. For example, biometrics may be used to identify the user to the application and/or authenticate the user to the application. An authorized user of the application or application services may be an identified user and/or an authenticated user.

An example of identification may be an application that is capable of having multiple profiles for multiple users. By accepting a user's biometric input, the application may be able to identify one user from the other users, and provide the identified user with application services based on or access to that user's particular profile. Meanwhile, an example of authentication may be a scenario where an application simply needs to know that the user is authorized to use the application, and the application does not care about the identity of the user. For example, a media streaming application may not differentiate between a husband and wife, but only cares that the user attempting to gain access is one of the two users on the media streaming provider's account. Referring back to the media streaming application, an example of the authentication and identify scenario in which a husband, wife and child are on the account, the application may wish to not only authenticate that the user requesting access to the application is one of the three persons (e.g., husband, wife, or child) on the account, but also implement parental controls, in which case, the identity of the requesting user is also necessary.

A secure biometric application programming interface (API) 121 is provided to facilitate control by one of the secure biometric applications, APP1-APPN, over the information provided to the mobile device biometric module 122. The biometric module 122 is under control of the operating system that is generic to the mobile device.

The secure biometric API is proprietary to the operating system (OS), and is not part of the OEM applications or software on the device. In other words, the secure biometric API is configured to interact with multiple devices instead of only with one device (e.g., the one device on which it is installed). The secure biometric API may be extensible to support additional biometric sensors (i.e., in addition to the fingerprint sensor).

In an example, the secure biometric API 121 for the mobile device is available through an online store and allows a user to use secure biometric applications by providing access the biometric module embedded in (and which may be proprietary to) the user's mobile device. Fields in API may refer to security level, or memory location, such as a subscriber identity module (SIM)-based secure element (SE) that stores enrolled templates for use by the matcher when performing a matching process. An embedded SE or other form of secure embedded memory that are a non-removable part of the mobile device are also envisioned for use with the disclosed example. Alternatively, the memory may also have a secure mode instead of using a certified secure element.

The biometric module is configured to implement one or more Activities with instructions to user, error messages, etc. Of course, the API is configured to interact with one or more biometric sensors that are different from a fingerprint module. For example, the API is generic enough to allow a voice print, retinal scanner, or the like.

The secure biometric API 121 provides a secure biometric mobile device application, such as applications APP 1-APP N, with access to the biometric module 122, and the biometric activity 124 and biometric service 126. For example, the mobile device secure biometric API 121 may define a set of procedure calls that an external, third party application (i.e., not native to the OEM biometric module or the mobile device operating system (OS)) may implement for the application to exchange data with the telephony device 102. The procedure calls may determine how controls signals (e.g., generating an application specific partition in the memory device, specifying particular enrolled templates for matching, stringency of matching criteria, and the like) are to be sent from the application and any connected devices, such as remote servers, to the biometric module 122 and how the biometric module 122 responds to the control signals. The operation of the secure biometric API 121 is described in more detail with reference to FIG. 2.

The biometric module 122 may include a biometric activity 124 and a biometric service 126. A fingerprint service is a software model that includes enrollment, matcher/verifier and removal. A matcher/verifier is a software module that performs a match between 2 templates. The matcher/verifier is a part of the fingerprint service.

An activity, such as biometric activity 124, is an application component that provides a user interface for receiving inputs and delivering information to users, such as, for example, input a biometric, dial the phone of the mobile device, take a photo with a camera, send an email via an e-mail application, view a map via a mail application, or the like. For example, an activity may be given a window on a touchscreen in which to draw the user interface. The window typically fills the touchscreen, but may be smaller than the touchscreen and float on top of other windows. An application usually consists of multiple activities that are loosely bound to each other.

In general, a service, such as biometric service 126, is an application component that may perform long-running operations in the background, but does not provide a user interface. Another application component can start a service and it will continue to run in the background even if the user switches to another application. For example, a service might handle network transactions, play music, perform file input/output (I/O), or interact with a content provider, all from the background.

The biometric service 126 includes the sensor 137 as well as a matcher, a driver, and optionally encryption algorithms to encrypt templates. The biometric service 126 uses the sensor 137 and a partitionable memory 135 to provide a biometric result output. The types of sensors available for biometric input include optical sensors (which are typically used in devices having a form factor larger than a mobile device (e.g., entryways)), a thermal sensor, ultrasonic, and a capacitive (active and passive) sensor. Capacitive sensors are the sensor type typically found on mobile devices. In an example, the sensor 137 when configured as a fingerprint sensor that includes a driver that allows the biometric module 122 and the sensor 137 to communicate with one another. A fingerprint may be inputted into the sensor 137 by swiping a finger over/across the sensor or by placing the finger on a touch (i.e. area) sensor. In response to the placement of the fingerprint on the sensor, the sensor 137 captures an inputted fingerprint. From the inputted fingerprint, the sensor 137 builds a fingerprint image and extracts minutia points (e.g., whorl, arch, and loop patterns). The extracted minutia points are maintained in a trial template. The sensor 137 using a matcher provided by, for example, a manufacturer of a sensor and sensor driver or another party, attempts to match (e.g., by comparing or other recognition method) the extracted minutia points in the trial template to enrolled templates.

In an example, the matcher/verifier of sensor 137 is configured to support a match rate that may be provided by a calling application. For example, the calling application, such as App 1 may require a higher match threshold (shown as a value) or higher match rate (shown as a percentage). In other words, the requirements for indicating a successful match by matcher are more stringent. For example, a standard match threshold for the matcher may be 10 minutiae points matching between a trial template and an enrolled template, but, instead, the application request may indicate a higher match threshold, such as, for example, 13, or some similar value. Alternatively, the application request may indicate a higher match rate, such as 98% than the default match rate, which may be, for example, 95%. If a required match rate is not provided, the matcher may be configured to use the default match rate, 95%. In another example, the matcher may use only the enrolled fingerprint templates that are enrolled with the calling application. If the match rate between the fingerprint template and the enrolled fingerprint template is equal to or higher than default match threshold (or rate), the matcher returns an index of the enrolled fingerprint template that resulted in a success match.

The calling application, in another example, may also specify an indicator of an enrolled fingerprint template that the matcher is to use to perform the matching process. If an indicator is specified by the calling application, any enrolled fingerprint templates stored in the same memory domain other than the specified enrolled fingerprint may be ignored by the matcher.

The partitionable memory 135 is a secure database, which means that the biometric service 126 limits access to the database by implementing a security protocol that authenticates users or applications attempting to access the database as authorized users or applications. The security protocol may take various forms that are suitable for providing the authentication function. The partitionable memory 135 may be managed by biometric service 126 based on inputs received via the secure biometric API 121 from secured biometric applications authorized to use the secure biometric API 121. The partitionable memory 135 may store enrolled templates, which are templates generated by an enrollment process as explained above. The partitionable memory 135 may be partitionable based on instructions from the biometric module 122. For example, the partitions 134 may include one or more of a system storage, biometric module service enrolled templates, an APP1 enrolled templates, an APP2 enrolled templates, an APP3 enrolled templates, an APPN enrolled templates, and the like. In a further example, the memory domain partitions 134 may be further partitioned into a memory domain(s) for a specific user(s). For example, the application APP 1 may be further partitioned into subpartitions specific to individual users, such as User 1 and User 2 of the APP 1 application. Each of the sub-partitions may be managed in a similar manner as a partition. For example, a user, such as User 1, may store multiple enrollment templates (e.g., multiple fingers, voiceprints, facial from the same User 1 or from a group of persons, such as User 1 and spouse/family, co-workers (in the case that the mobile device is business device), and the like).

The above software architecture example may be used in a number of different biometric implementations. An example implementation of a fingerprint biometric process will be discussed with reference to FIG. 2; however, other biometrics, such as retinal, voice, or facial, may utilize the process of FIG. 2. Of course, other processes may be implemented utilizing the software architecture example provided in FIG. 1.

Figure 2:
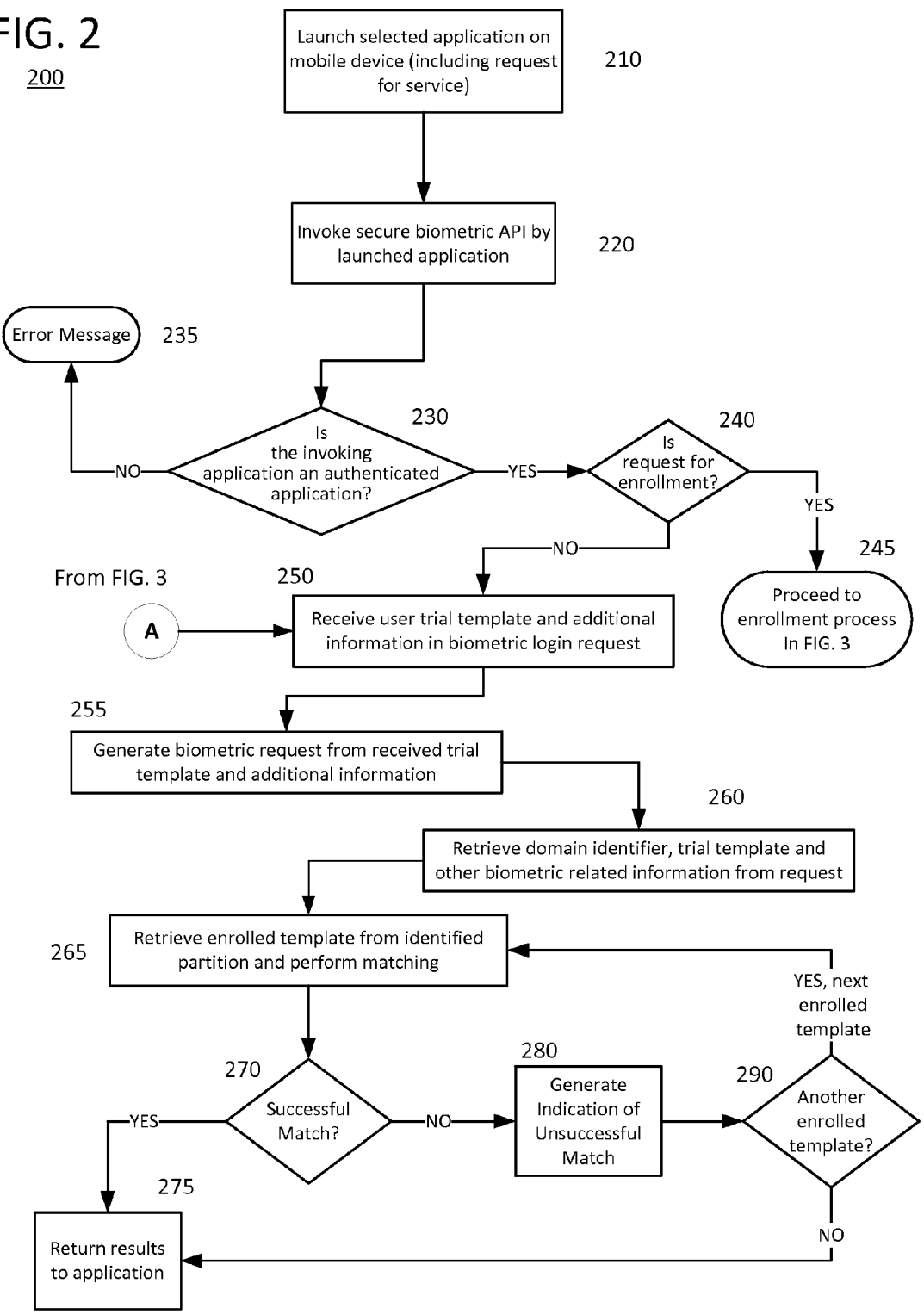
FIG. 2 illustrates a flow diagram of an example of a biometric application interaction process via an application programming interface of a biometric module of a mobile device.

FIG. 2 illustrates a flow diagram of an example of a biometric application interaction process with a biometric module of a mobile device. A mobile device may include a processor, a memory and other components as will be described in more detail with respect to FIGS. 5 and 6. The mobile device processor may be configured to execute computer programming instructions (i.e. software) stored in the memory. The above described application programming interface may be utilized by the mobile device processor to implement a process similar to the following process. A user selects a secure biometric application from a menu of applications presented in a user interface on a mobile device display device. A secure biometric application may be, for example, an electronic wallet application on a user's mobile device, a subscription video streaming application, a banking application, or any other application that uses a biometric as a log in or as one factor in a two factor authentication process. In response to the selection, as illustrated in process flow 200, the selected secure biometric application launches on a mobile device at 210 and begins to execute.

For example, upon launch, the application may cause the processor to present a login prompt on the display device (e.g., touchscreen) of the mobile device. In addition, the application invokes (i.e. calls) a secure API, such as secure biometric API 121 of FIG. 1 (220). The secure API may only be used by authorized applications. An authorized application may be an application authorized by the mobile device original equipment manufacturer (OEM), a mobile network operator (MNO) that provides services, such as the secure API, a third-party vendor or partner of the OEM, the MNO or both. For example, the application may be signed with an authentication certificate and authenticated by the OEM, the MNO or a third-party. An authentication server, which may be a dedicated server, may certify the application by signing the application. For authentication purposes, a common key may be used. At 230, the mobile device processor determines via the secure API whether the application is an authorized application. For example, the mobile device processor, in response to an attempt by the selected application access the secure API, the mobile device, via a transceiver, communicates with a mobile communication network, and requests that an MNO server (e.g., a sign authentication server) to determine if the selected application is a secure biometric-enabled application authorized to access the secure API. In other words, the mobile device is requesting that a sign authentication server authenticate the secure, biometric-enabled application. If the application is not an authorized application (i.e., the authentication result is a failure (i.e., NO)), an error message with or without a prompt to retry or use an alternative login may be presented on the mobile device display device. Alternatively, if the authentication is successful (i.e., YES), the process 200 proceeds to decision block 240.

At 240, a determination is made, for example, based on a user input or upon an initial launch of the application, whether the user is requesting to enroll a biometric for use with the application. If the determination is YES, the user is requesting enrollment, an enrollment process may begin. The enrollment process is discussed in more detail with reference to FIG. 3, which follows the discussion of FIG. 2. Alternatively, the determination that an enrollment process is requested may be a NO, in response to which the process proceeds to 250. At 250, the processor may receive information in a biometric request. The biometric request may include one or more of the following: an identifier of the memory domain associated with the application, a user identifier (e.g., in the case of APP 1 of FIG. 1, an identifier of User 1 or an identifier of User 2), an identifier of a user sub-partition within the identified memory domain, an index (e.g., an identifier) of an enrolled template associated with the user identifier, a list of indices, a match threshold value (i.e., a custom threshold value for indicating a successful match that may be higher or lower than a standard match threshold value, for example, of the sensor 137 of FIG. 1. via a user interface from the user, from user preferences associated with the secure application or both. For example, the application may receive part or all of the information for inclusion in the biometric request via a user interface. Similarly, the user's preference storage may provide part or all of the information used in the generation of the biometric request. Alternatively or in addition, the application may populate the biometric request with information retrieved from a user preferences data storage (on the mobile device) or from an external server associated with the application.

For example, at the launch of the secure biometric application (at 210), the application may establish a connection with an external server associated with the application. The external server may provide, in response to the established connection, a higher match threshold or other information specific to the respective application At 250, for example, a screen on the user input interface may present a prompt for the user to initiate a biometric log in to the secure biometric application. Of course, one or more different biometrics (e.g., retina scan and fingerprint) may be input in response to the prompt, but, in the present example, the user may initiate the biometric log in by inputting a user fingerprint. In other embodiments, multiple fingerprints or combinations of biometrics may be input by a user. The mobile device biometric sensor, such as sensor 137, receives the user fingerprint input. The mobile device biometric sensor receives a user biometric input and builds an image of the fingerprint input. After the fingerprint image is built, the mobile device biometric sensor processes the image to locate unique identifiers in the built image from which a trial template is generated. The mobile device biometrics module forwards the trial template generated by the mobile device biometric sensor to the mobile device biometrics module. Alternatively, the trial template may be stored in a secure memory accessible by only the mobile device biometrics module for further processing.

In response to the generation of the trial template, the mobile device biometrics module may retrieve the trial template, a domain (or partition) identifier, if provided with the biometric request, any custom matching thresholds/rates, a user identifier, or other information, if provided with the request or obtainable based on the biometric request (260). For example, the biometrics module 122 obtains from the biometric request an identifier of a memory domain and a list of (e.g., one or more) enrollment templates in the identified domain to use (e.g., all or specific ones), when analyzing enrollment templates in comparison to a trial template to which the image unique identifiers matched. In a further example, a user name or the like may be obtainable based on a user identifier included in the request. In addition, the biometric request may include an indication that only a subset of enrolled templates related to the biometric application are to be used for a matching operation (e.g., in the case of a multiple user application User 1 enrolled templates and not User 2 enrolled templates). If it is determined that the custom matching thresholds/rates do not apply, the biometrics module uses default matching thresholds/rates.

At 265, the biometrics module 122 accesses the domain of the enrolled template memory indicated by the domain identifier to retrieve an enrolled template or templates for matching to unique identifiers located in biometric trial template. In an example, the calling application may specify, in or with the request for a biometric login, an indicator of an enrolled fingerprint template that the matcher is to use to perform the matching process. If an enrolled template indicator is specified by the calling application, any enrolled fingerprint templates stored in the same memory domain other than the specified enrolled fingerprint may be ignored by the matcher.

Using the retrieved enrolled template and the trial template, the biometrics module 122 analyzes the trial template and the enrolled templates stored in the indicated domain (270). If the match result, at 270, indicates a successful match, a successful match result indication is generated, and the process 200 proceeds to 275. Regardless of whether an indicator of an enrolled fingerprint template is provided by the calling application, the matcher, upon a successful match result, delivers an index indicating the successful match to the calling application. In an example, the matcher index may also be an indicator of the enrolled template to which the trial template matched. In an example in which there are multiple matches from multiple enrolled fingerprint templates subject to the match determination, the matcher may return a success indication with the index of the enrolled fingerprint template which had the highest match rate. At 275, in response to completion of the analysis, the mobile device biometrics module provides match results to the application. The match results may include varying levels of detail regarding the successful match results. For example, the match results returned to the application may include an index (i.e., identifier) of the enrolled template that resulted in a successful match indication, an indication of the match percentage or similar metric, an identifier of the user whose enrollment template resulted in the successful match, a simple indication of a successful match, or the like.

Alternatively, at 270, if the determination is "NO, the match result is unsuccessful," the process 200 proceeds to 280. At 280, the matcher may generate an indication of an unsuccessful match. The generated indication may be stored in memory, while at 290; the processor determines whether another enrolled template is to be compared to the trial template. If there are no other enrolled templates for matching by the matcher (i.e., response is "NO" at 290), the process proceeds to step 275. At 275, an indication that none of the enrolled templates matched the trial template is returned in the match results to the application. In another example, a determination may be made at 290 that a predetermined number of unsuccessful matches (e.g., 3-5 matches or some other user-settable value) for the current user has not yet been reached, in which case the determination result at 290 is a "YES," and the next enrolled template may be the same one or more enrolled templates examined for the current user. When the predetermined number of unsuccessful matches is reached, the determination at 290 is "NO," and the process 200 proceeds to 275.

Alternatively, in response to the indication that none of the enrolled templates matched the trial template, the application may prompt the user to determine if the user wants to try again. In response to an input indicating a re-try attempt by the user, a new request for service may be generated, and the process 200 starts anew at 210. Alternatively, a screen may be presented on the display device indicating that the user is locked out (e.g., for a predetermined amount of time, until a customer service center is contacted, until a username and/or password are entered, or the like).

Alternatively, if the response to the determination at 290 is "YES, there is a next enrolled template," then the process 200 returns to step 265 and the process 265-290 repeats until there is either a successful match or none of the enrolled templates successfully match the trial template.

Figure 3:
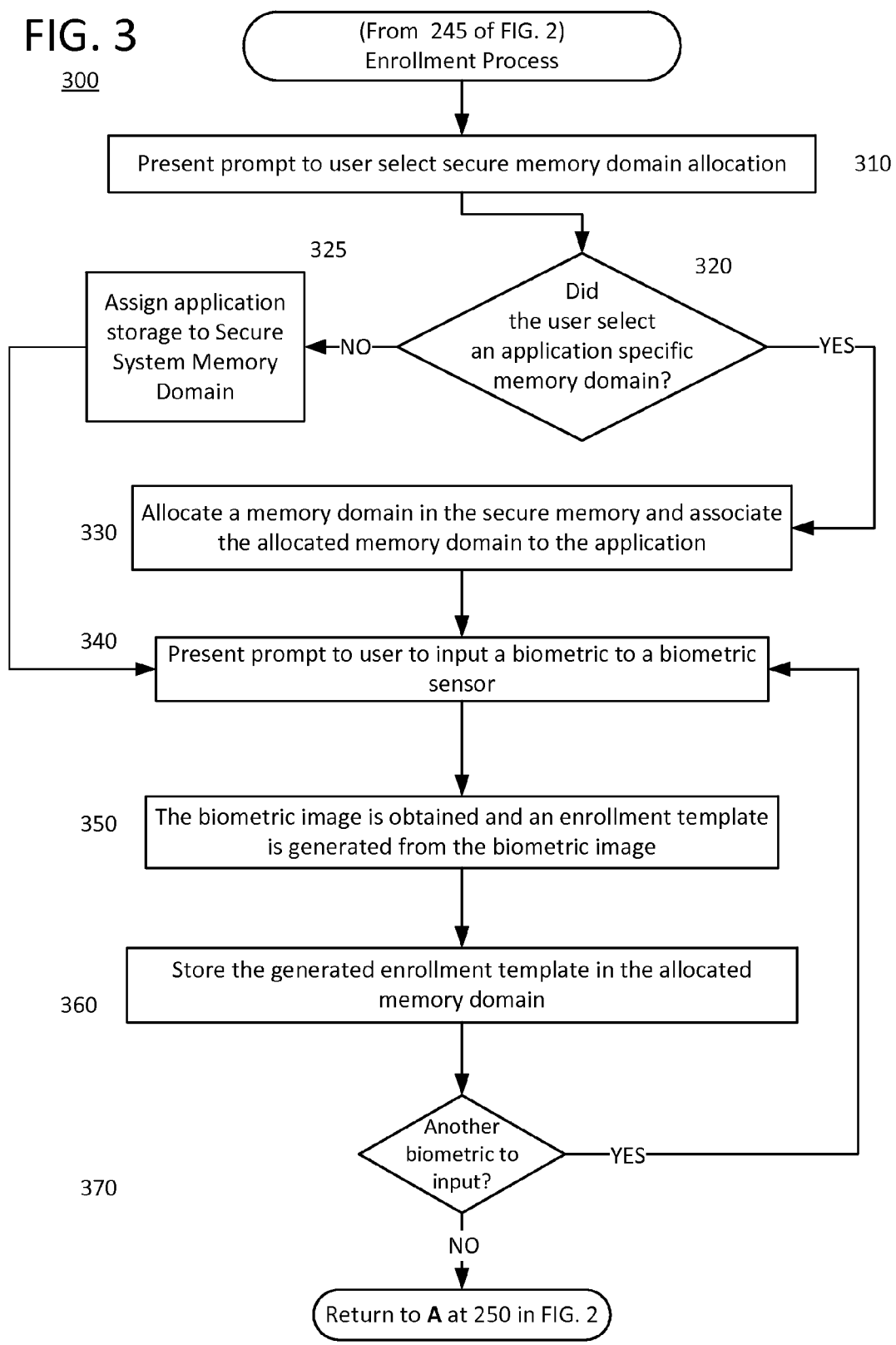
FIG. 3 illustrates a flow diagram of an example of a biometric application enrollment process via an application programming interface of a biometric module of a mobile device.

FIG. 3 illustrates a flow diagram of an example of a biometric application enrollment process via an application programming interface of a biometric module of a mobile device. Referring back to determination 240, in response to the determination that the application biometric request requires an enrollment process, the process 200 proceeds to enrollment process 300 of FIG. 3.

In an example, the secure biometric application may require the user to establish an account or otherwise, authenticate herself to a secure biometric application server by, for example, by presenting a prompt for input of user text-based credentials for authenticating the user for access to the biometric application server. The text-based credentials are alphanumeric characters (e.g., a personal identification number, a password, or the like) that identify a user. At the beginning of the enrollment process 300, the application causes the processor to present in a user interface on a display device of the mobile device a prompt for the user to select a secure memory domain allocation 310. For example, the prompt may be a menu of secure memory locations that has increasing greater levels of security for the enrolled templates. For example, a default encryption for enrolled fingerprint templates may use advanced encryption standard (AES) 256-bit algorithm; and an encryption key may be generated by the biometric service 126 using a random number generated on the mobile device. The encryption key may be securely stored in a default system memory domain, and may be managed by the biometric service 126 instead of the calling application. Alternatively, the user may select different encryption algorithms and methods as well as other storage options. For example, the presented prompt may offer the user an option to create a memory domain specific to the application for storage of the enrolled templates that are about to be generated by the enrollment process 300. In this case, the application is capable of managing the enrollment templates via the secure biometric API 121 and the biometric service 126.

In response to the user inputs, a determination at 320 is made whether the user selected an application specific memory domain to be created. If determination is "YES," the process 300 proceeds to 330. In response to the user selection to create a biometric application specific memory domain at 320, the biometric service 126, at 330, in response to an instruction received via the secure biometric API 121, creates a memory domain (i.e., partitions a portion of a secure memory) that is allocated to the biometric service for allocation to the biometric application. The memory domain is associated with the biometric application. By associating the secure memory domain with the biometric application, the biometric application via the secure biometric API is able to manage the contents of the secure memory domain. The management of the memory domain associated with the biometric application is discussed in more detail below. After associating the memory domain to the biometric application, the process 300 proceeds to 340.

Or, if a partition to the application already exists (i.e., the current user is a subsequent user to a user having enrolled templates), the biometric service may generate a sub-partition that is a user-specific sub-partition in the memory domain allocated to the application (e.g., User 1 and User 2 in APP1 templates of FIG. 1).

For example, electronic wallet applications using an NFC service on a mobile device are becoming more prevalent. Electronic wallet applications allow access to user's store credit cards and/or other information. Considering that entry into the electronic wallet application provides the user with access to personal information, the electronic wallet application developers want to ensure that user is an authorized user. Typical applications, such as electronic wallet applications, store all enrollment templates with other enrollment templates generated by other applications that may also use biometrics in a system memory. As a result, if there are a number of templates stored on a device (e.g., a family tablet or similar device) all of the enrollment templates from any application that uses biometrics are stored together, or the enrollment templates may be stored separately in a memory domain sub-partition for each user.

Alternatively, if the user chooses not to select an application specific memory domain (i.e., the determination at 320 is "NO"), the biometric service 126 assigns the application to secure system memory domain at 325, and associates the assigned system memory domain to the application. The secure system memory domain is a memory domain within the mobile device memory that is commonly shared with other applications. In which case, when the calling biometric application is assigned to the secure system memory domain, the enrolled templates associated with the calling application are stored with other enrolled templates generated by other applications, such as a biometric lock/unlock application for the mobile device, or other biometric applications that may permit a reduced level of security or may have limited management capabilities that prevent user selection of a separate memory domain for the application. In response to the assignment of the application to the secure system memory domain, the process 300 proceeds to 340.

In an alternative example, at steps 310 and 320, the application may deliver a parameter to the biometric service indicating the capabilities of the application to manage a memory domain specifically allocated to the application as would occur in step 330. In response to the delivered parameter, the biometric service may forego the presentation of a user selection prompt in steps 310 and 320. The delivered parameter may also indicate to the biometric service that the application does not have the capabilities to manage a memory domain. In this case, the biometric service may proceed to 325 for association of the secure system memory domain to the application.

At 340, a prompt is presented to the user to input a biometric to a biometric sensor. The prompt may be presented on a user interface, such as a display or a touchscreen display, of the mobile device for the user to provide a biometric, such a fingerprint, to the biometric sensor, such as a fingerprint sensor. In other words, the user may be prompted to place a finger on a fingerprint sensor or swipe a finger across a fingerprint sensor.

After a user performs the input action (e.g., finger swipe), a biometric image is obtained by the fingerprint sensor, and an enrollment template is generated from the obtained image (350). Using a fingerprint image obtained from the fingerprint sensor, the biometric module or biometric sensor extracts a fingerprint template from the fingerprint image. As discussed above, the biometric sensor may extract minutiae points from the fingerprint image to generate the fingerprint template. The fingerprint template is used as an enrollment template, and may be prepared (e.g., encrypted or compressed or both) for storage in the secure memory domain allocated to the user or in the secure system memory domain of the mobile device. At 360, the enrollment template is stored in either the secure memory domain allocated at 330 or in the secure system memory domain allocated at 325.

The biometric image is obtained and an enrollment template is generated from the biometric image (350). Depending upon the application more than one biometric may be used for logging into the application (e.g., a thumb and a forefinger, or, if configured, a retina and a finger, voice and finger or some other combination), in which case another biometric may be input. At 360, the generated enrollment template is stored in the allocated memory domain at 330 or the assigned system memory domain at 325. The stored enrolled templates are associated with the specific biometric application (e.g., APP1, APP2 and so on from FIG. 1), which called the enrollment process of the fingerprint service, and the information of the calling application which owns the enrollment templates is also stored with the enrollment templates. In another example, the stored enrollment template includes an index to identify itself. For example, a first enrollment template (i.e., index 1) for User 1 of application APP1, a second enrollment template (i.e., index 2) for User 2 of application APP1, and so on for a maximum number of enrollment templates and related information suitable for storage in the allocated memory domain.

A determination at 370 may be made that another biometric is to be input. If the response is YES, then the process returns to 340, where the user is prompted to input a next biometric. For example, some applications may allow a user to present multiple fingerprints from different fingers for enrollment. For example, a first fingerprint may be used to gain access to the application, and another fingerprint may be used to gain access to different data or functions within the application. Of course, other features and options may also be implemented using the multiple enrolled templates.

Alternatively, if the response is NO, there are no other biometrics to enroll, the process returns to FIG. 2 for further processing, at, for example, element 250. The YES or NO determination at 370 may be predetermined based on a parameter provided by the application indicating the need for enrolling additional fingerprints. For example, the application may require the user to match two fingerprints in order to log into the application or for further access to the application functions.

As referred to above, the extent of management capabilities of the memory domain associated with the biometric application depends upon the robustness of the memory management features of the biometric application. The secure biometric API may, in certain examples, provide complete control of the memory domain associated with the biometric application to the biometric application. In other words, the biometric application, depending upon the biometric application's capabilities, may configure a processor to provide different functions, such as being able to delete enrolled templates, instructing the matcher to use higher or lower match thresholds, indicating which enrolled templates should be used when attempting to match a specific user, the number of attempts a user may have to perform a biometric match before being required to use an alternate form of authentication, the number of enrolled templates a user may have for logging into the application (e.g., the user may have a forefinger, a little finger and a thumb), and the like.

In an example, the biometric application configures a processor to only allow the biometric application access via the secure biometric API to the memory domain associated with the biometric application when a successful match result is returned at 275 in FIG. 2, or when an installation of the biometric application on the mobile device is performed. In another example, access to the associated memory domain may be reduced in stages in response to a match failure indication at 275 of FIG. 2. For example, an initial failure may limit management of the memory domain associated with the biometric application to features that do not allow the match thresholds to be changed, or enrollment of new enrollment templates for the same user or for different users, but the biometric application may be allowed to view information related to the enrollment templates (e.g., number of templates, user names, match thresholds and the like) or other information stored in the associated memory domain. Of course, other forms of limiting access to a memory domain due to an unsuccessful match at 275 of FIG. 2 by the biometric application associated with the respective memory domain may be implemented.

Figure 4:
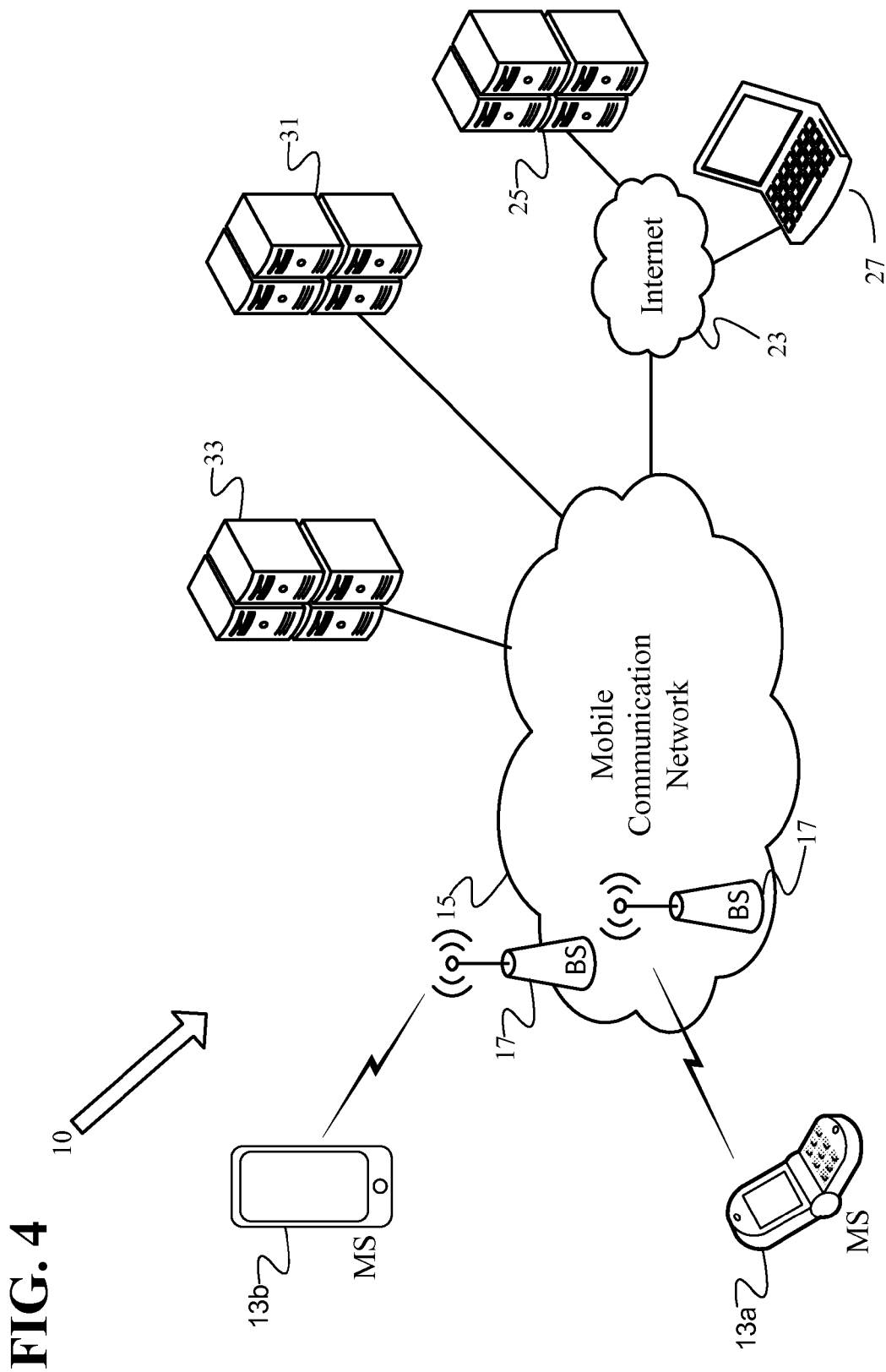
FIG. 4 is a high level functional block diagram of an example of a network implementation incorporating the secure biometric application control service.

FIG. 4 illustrates a system 10 offering a variety of mobile communication services, including communications for the secure, biometric-enabled application control system by mobile device users. The example shows simply two mobile devices 13*a* and 13*b* as well as a mobile communication network 15. The devices 13*a* and 13*b* are examples of mobile devices that may be used for the secure, biometric-enabled application control system. However, the network 15 will provide similar communications for many other similar users as well as for mobile devices/users that do not participate in the secure biometric control application. The network 15 provides mobile wireless communications services to those devices as well as to other mobile devices (not shown), for example, via a number of base devices (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13*a* and 13*b* may be capable of voice telephone and data communications through the network 15, and for the services needed to implement the secured, biometric-enabled application control system, the exemplary devices 13*a* and 13*b* are capable of data communications through the particular type of network 15 (and the users thereof typically will have subscribed to data service through the network).

The network 15 typically offers a variety of data services via the Internet 23, such as downloads, web browsing, email, etc. By way of example, the drawing shows a laptop PC type user terminal 27 (which may also be a tablet or other computing device utilizing biometric logins) as well as a server 25 connected to the Internet 23; and the data services for the mobile devices 13*a* and 13*b* via the Internet 23 may be with devices like those shown at 25 and 27 as well as with a variety of other types of devices or systems capable of data communications through various interconnected networks. The mobile devices 13*a* and 13 of users of the secured, biometric-enabled application control system also can receive and execute secure, biometric-enabled applications written in various programming languages, as discussed more later.

Mobile devices 13*a*, 13*b* can take the form of portable handsets, smart-phones or personal digital assistants, although they may be implemented in other form factors. Program applications, including an application to assist in the secure, biometric control system and/or any an application purchased via the on-line application store can be configured to execute on many different types of mobile devices 13*a*, 13*b*. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The system 10 can be implemented by a number of interconnected networks. Hence, the overall system 10 may include a number of radio access networks (RANs), as well as regional ground networks interconnecting a number of RANs and a wide area network (WAN) interconnecting the regional ground networks to core network elements. A regional portion of the system 10, such as that serving mobile devices 13, can include one or more RANs and a regional circuit and/or packet switched network and associated signaling network facilities.

Physical elements of a RAN operated by one of the mobile service providers or carriers, include a number of base devices represented in the example by the base devices (BSs) 17. Although not separately shown, such a base device (BS) 17 can include a base transceiver system (BTS), which can communicate via an antennae system at the site of base device and over the airlink with one or more of the mobile devices 13*a* and 13*b*, when the mobile devices are within range. Each BS 17 can include a BTS coupled to several antennae mounted on a radio tower within a coverage area often referred to as a "cell." The BTS is the part of the radio network that sends and receives RF signals to/from the mobile devices 13 that are served by the BS 17.

A mobile device 13*a*, 13*b* communicates over the air with a base device 17 and through the mobile communication network 15 for various voice and data communications, e.g. through the Internet 23 with a server 25 and/or with application servers 31. If the mobile service carrier offers the authentication service via the sign server 33, the service may be hosted on a carrier operated application server 31, for communication via the networks 15 or 23. Alternatively, the application authentication functions may be provided by a separate entity (alone or through agreements with the carrier), in which case, the application authentication service may be hosted on an application server such as server 25 connected for communication via the networks 15 and 23. Server such as 25 and 31 may provide any of a variety of common application or service functions in support of or in addition to an application program running on the mobile device 13*a*, 13*b*. However, for purposes of further discussion, we will focus on functions thereof in support of the mobile secure, biometric-enabled application control system. For a given service, including the biometric service, an application program, such as the application providing the biometric services 126 and activities 124 of the biometric module 122, within the mobile device may be considered as a 'client' and the programming at 25 or 31 may be considered as the 'server' application that provide the particular authentication service.

To insure that the secured, biometric-enabled application, which is attempting to use the biometric services 126 and activities 124 of the biometric module 122 in a mobile device 13*a*, 13*b*, is available to only authorized devices/users, the provider of the secure, biometric-enabled application control system, (e.g., the mobile network operator) also deploys a sign server 33. The sign server 33 could be a separate physical server as shown, or sign server 33 could be implemented as another program module running on the same hardware platform as the application server 31. For example, when the application server (server 31 in our example) receives a service request from a client application on a mobile device 13, the application server 31 provides appropriate information to the sign server 33 to allow sign server 33 to authenticate the mobile device 13 as outlined herein. Upon successful authentication, the sign server 33 informs the application server 31, which in turn provides access to the service via data communication through the various communication elements (e.g. 15 and 17) of the network 10. A similar authentication function may be provided for other biometric service(s) offered via the server 25, either by the server 33 if there is an appropriate arrangement between the carrier and the operator of server 24, by a program on the server 25 or via a separate authentication server (not shown) connected to the Internet 23.

The enhanced mobile secured, biometric control system under consideration here may be delivered to touch screen type mobile devices as well as to non-touch type mobile devices. Hence, our simple example shows the mobile device (MS) 13*a* as a non-touch type mobile device and shows the mobile device (MS) 13 as a touch screen type mobile device. Implementation of the secured, biometric control system will involve at least some execution of programming in the mobile devices as well as implementation of user input/output functions and data communications through the network 15, from the mobile devices. The enhanced secure biometric control system under consideration here may be delivered to touch screen type mobile devices as well as to non-touch type mobile devices. Hence, our simple example shows the mobile device 13*a* as a non-touch type mobile device and shows the mobile device 13 as a touch screen type mobile device. Implementation of the secure biometric service will involve at least some execution of programming in the mobile devices as well as implementation of user input/output functions and data communications through the network 15, from the mobile devices.

It may be useful to consider the functional elements/aspects of at least one of the exemplary mobile device 13*a* and 13*b*, at a high-level.

Figure 5:
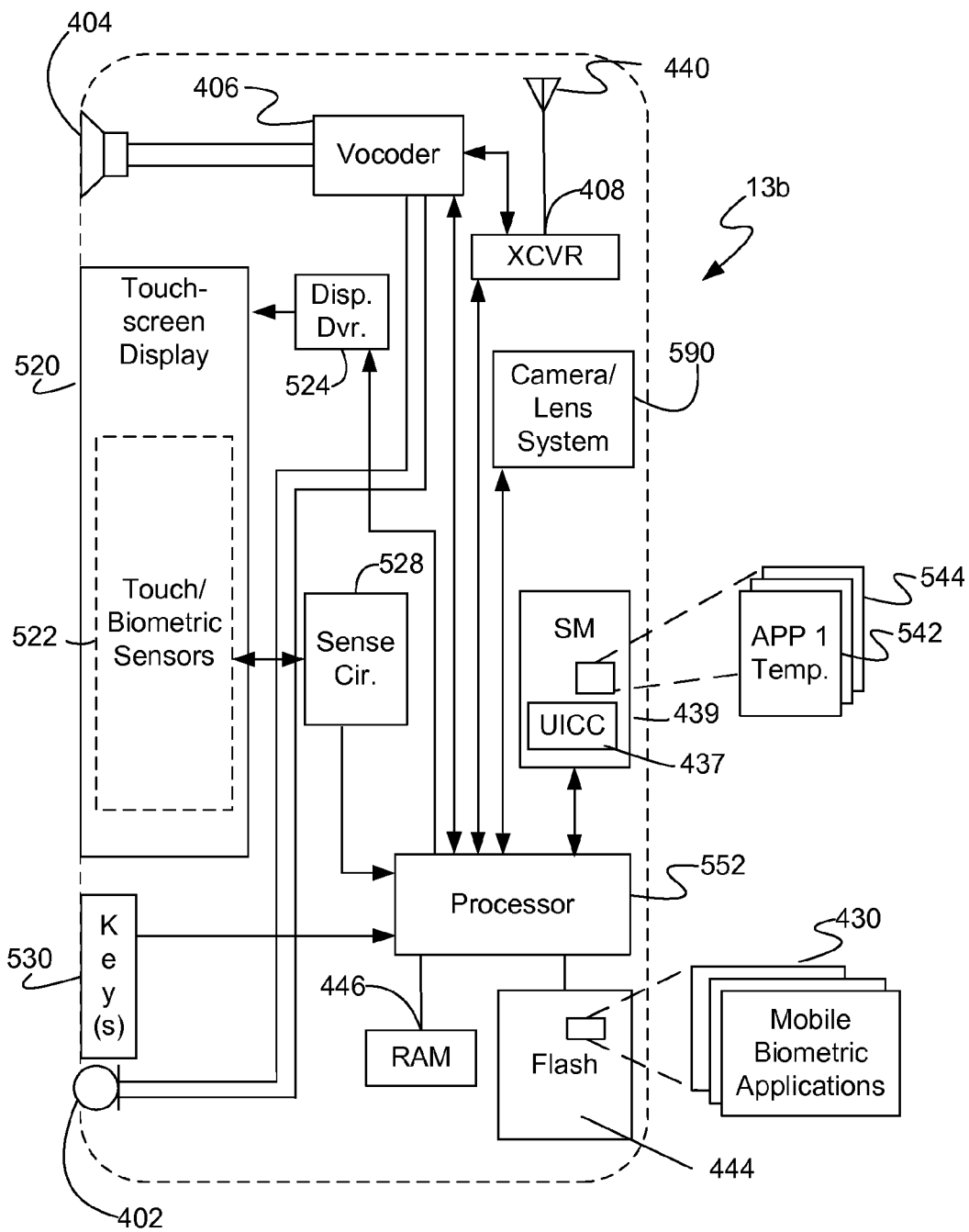
FIG. 5 is a high-level functional block diagram of an exemplary touch screen type mobile device as may utilize the secure biometric application control service.

For purposes of such a discussion, FIG. 5 is a high-level functional block diagram of an exemplary touch screen type mobile device 13*b* as may utilize the secure biometric application control service. Although the mobile device 13*b* of FIG. 5 may be a smart-phone or may be incorporated into another device, such as a personal digital assistant (PDA) or the like, for discussion purposes, the illustration shows the mobile station 13*b* is in the form of a handset. The handset embodiment of the mobile device 13*b* functions as a normal digital wireless telephone device. For that function, the station 13*b* includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13*b* also includes at least one digital transceiver (XCVR) 408. Today, the handset 13*b* would be configured for digital wireless communications using one or more of the common network technology types. The concepts discussed here encompass embodiments of the mobile device 13*b* utilizing any digital transceivers that conform to current or future developed digital wireless communication standards. The mobile device 13*a* may also be capable of analog operation via a legacy network technology.

In order to run secure applications such as the biometric module 122 of FIG. 1, there is a secure memory (SM) 437. In one example, the SM 437 is separate chip that includes a secure processor, a tamperproof storage and a memory, and is configured to communicate with applications executing on the processor 442 and to maintain the enrolled templates stored therein by the biometric module. In another example, the SM 437 is a memory that is part of the system memory of the mobile device 13*b*, and is configured to maintain the enrolled templates stored therein by the biometric module. The SM 437 may be a physically secure memory, a physical secure memory with a secure controller that may contain a matching algorithm, part of the system memory (less secure) with cryptography and obfuscation algorithms to help protect the enrollment templates (the processor 442 may be configured perform these functions), or part of the system memory but the processor 442 may be in a secure mode (e.g., ARM Trust Zone®) to perform the encryption function and to keep the encryption process and keys secure. For example, SM 437 stores the enrolled templates for APP 1-APP N. The SM 437 may be partitionable in response to control signals from respective secure biometric applications, as explained above.

For example, the biometric-enabled applications that run on the secure memory (SM) 437 typically run on a Javacard operating system. The SM may include various account information, such as account number, user identification, a personal identification number (PIN), or the like for user verification and possibly account balance and/or transaction record information. The SM 437 may be used to decode credentials of devices. In various examples, the SM 437 may be part a UICC 437 or a separate SM-like memory card, such as a secure digital (SD) memory card, used for storing and accessing applications and data, such as biometric-enabled application, in a secure manner. The logic implemented by the processor 442 of the mobile device 13*b* configures the processor 552 to control various functions as implemented by the mobile device 13*b*. The logic for a processor may be implemented in a variety of ways, but in our example, the processor logic is implemented by programming for execution by the processor 442.

The transceiver 408 provides two-way wireless communication of information, such as vocoded speech samples and/or digital information, in accordance with the technology of the network 45. The transceiver 408 also sends and receives a variety of signaling messages in support of the various voice and data services provided via the mobile device 13*a* and the communication network. Each transceiver 408 connects through RF send and receive amplifiers (not separately shown) to an antenna 440. The transceiver may also support various types of mobile messaging services, such as short message service (SMS), enhanced messaging service (EMS) and/or multimedia messaging service (MMS).

A microprocessor 552 serves as a programmable controller for the mobile device 13*b*, in that it controls all operations of the mobile device 13*b* in accord with programming that it executes, for all normal operations, and for operations involved in the secure biometric application verification or enrollment procedure under consideration here. In the example, the mobile device 13*b* includes flash type program memory 444, for storage of various "software" or "firmware" program routines and mobile configuration settings, such as mobile directory number (MDN) and/or mobile identification number (MIN), etc. The mobile device 13*b* may also include a non-volatile random access memory (RAM) 446 for a working data processing memory. Of course, other storage devices or configurations may be added to or substituted for those in the example. In a present implementation, the flash type program memory 444 stores firmware such as a boot routine, device driver software, an operating system, call processing software and vocoder control software, and any of a wide variety of other applications, such as client browser software and short message service software. The memories 444, 446 also store various data, such as telephone numbers and server addresses, downloaded data such as multimedia content, and various data input by the user. Programming stored in the flash type program memory 444, sometimes referred to as "firmware," is loaded into and executed by the microprocessor 552. For example, the flash type program memory 444 may store programming for implementing the biometric module 122 of FIG. 1, and as well as programming for implementing the secure, mobile biometric applications 430. The microprocessor 442 may access the programming in the flash type program memory 444 to execute the above-described biometric functions. For example, the flash memory 444 configures the processor 552 so that the mobile device 13*b* is capable of performing various desired functions, including in this case the functions involved in the technique for providing verification and/or enrollment processes of the secure biometric-enabled applications.

The microprocessor 552 serves as a programmable controller for the mobile device 13*b*, in that it controls all operations of the mobile device 13*b* in accord with programming that it executes, for all normal operations, and for operations involved in the secure biometric application verification and enrollment procedures under consideration here. In the example, the mobile device 13*b* includes flash type program memory 444, for storage of various program routines and mobile configuration settings. The mobile device 13*b* may also include a non-volatile random access memory (RAM) 446 for a working data processing memory. Of course, other storage devices or configurations may be added to or substituted for those in the example. Hence, outlined above, the mobile device 13*b* includes a processor, and programming stored in the flash memory 444 configures the processor so that the mobile device is capable of performing various desired functions, including in this case the functions involved in the technique for providing the secure biometric application verification and enrollment procedures. For example, the flash type program memory 444 may store programming for implementing the biometric module 122 of FIG. 1, and as well as programming for implementing the secure, mobile biometric applications 430. The microprocessor 552 may access the programming in the flash type program memory 444 to execute the above-described biometric functions.

The mobile device 13*b* of FIG. 5 may have a limited number of keys 530, but the user interface functions of the display and keypad are replaced by a touchscreen display arrangement. At a high level, a touchscreen display 520 is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. In addition to normal telephone and data communication related input/output (including message input and message display functions), the user interface elements (e.g., keys 530, touchscreen display 520, biometric sensors 522) also may be used for display of menus and other information to the user and user input of selections, including any needed during presentation of an application menu, a selection of matching threshold and match rate settings, indicators of enrollment templates indices to use during matching and the like. For example, if used to receive selections for the biometric application parameters, the user interface elements may respond to various inputs from a user.

Hence, the exemplary mobile device 13*b* includes a display 520, which the microprocessor 552 controls via a display driver 524, to present visible outputs to the device user. The mobile device 13*b* also includes a touch/biometric sensors 522. The sensors 522 are relatively transparent, so that the user may view the information presented on the display 520. A sense circuit 528 sensing signals from elements of the touch/biometric sensor 522 and detects occurrence and position of each touch of the screen formed by the display 520 and sensors 522. The sense circuit 528 may provide touch position information to the microprocessor 552, which can correlate that information to the information currently displayed via the display 520, to determine the nature of user input via the screen. The touch/biometric sensors 522 may also receive a biometric input, such as a fingerprint, from which the touch/biometric sensors 522 creates a template (enrollment or trial).

The display 520 and touch sensor 522 (and possibly one or more keys 530, if included) are the physical elements providing the textual and graphical user interface for the mobile device 13*b*. The microphone 402 and speaker 404 may be used as additional user interface elements, for audio input and output, including with respect to some secure biometric application and API related functions.

The structure and operation of the mobile device 13b, as outlined above, was described by way of example, only.

As shown by the above discussion, functions relating to the an enhanced secure biometric application experience for the biometric verification and enrollment service associated with the secure biometric application, via a graphical user interface of a mobile device may be implemented on computers connected for data communication via the components of a packet data network, operating as a secure biometric application access device and/or as a secure biometric input device. Although special purpose devices may be used, such devices also may be implemented using one or more hardware platforms intended to represent a general class of data processing device commonly used to run "server" programming so as to implement the secured, biometric-enabled application authentication functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for storing the secure biometric application information, including application parameters and/or secured, biometric-enabled application authentication functions. The software code is executable by the general-purpose computer that functions as the application authentication server and/or that functions as an implementing terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for facilitating the management of enrollment templates by a secure biometric application, in essentially the manner performed in the implementations discussed and illustrated herein.

Figure 6:
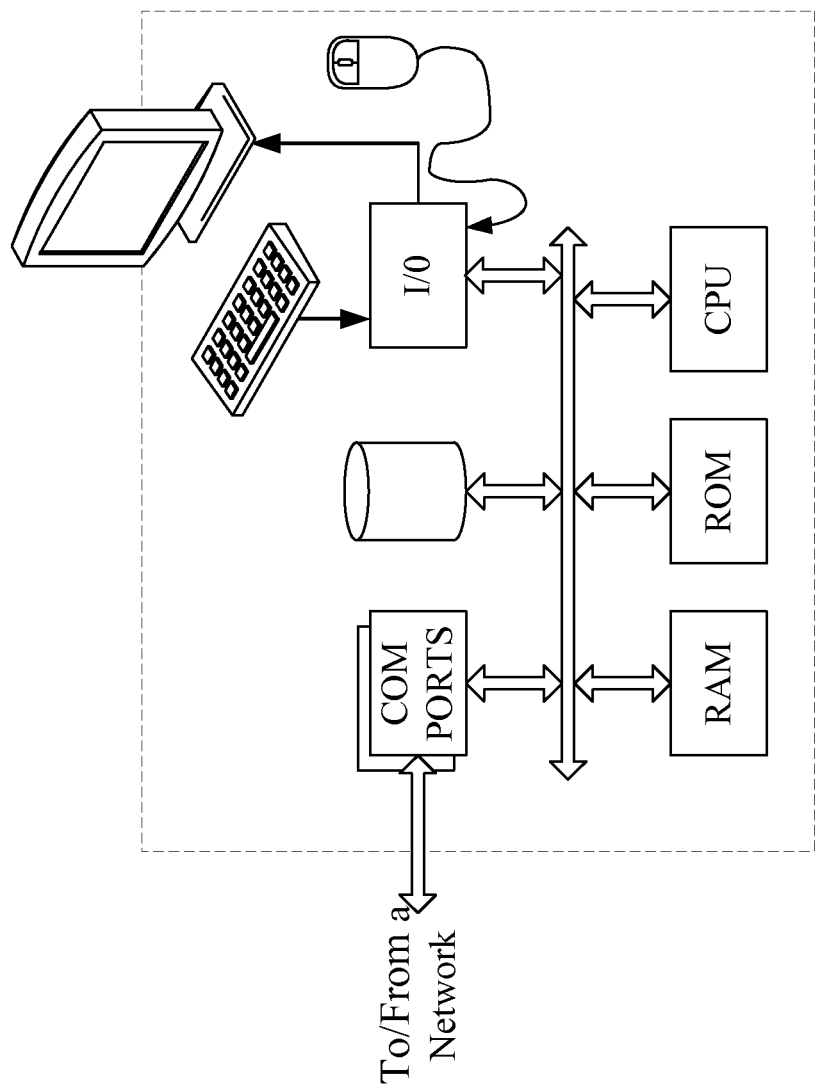
FIG. 6 is a simplified functional block diagram of a personal computer or other work station or terminal device.

FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIG. 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems, and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems, and programming languages of such user terminal devices also are conventional in nature.

Hence, aspects of the methods of facilitating the management of memory storing enrollment templates for a secure biometric application outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile network operator into the computer platform of the secure biometric application provider that will be the authentication server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement a process for facilitating the management of memory storing enrollment templates for a secure biometric application, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   identifying, by a mobile device processor that is implemented at least partially in hardware, a secured biometric-enabled application from among a plurality of applications on a mobile device based on receiving an input selecting a mobile device application, of the applications, for execution on the mobile device;
   prompting, by the mobile device processor, a user to provide a biometric input to a mobile device biometric sensor based on the identifying the secured biometric-enabled application of the plurality of applications;
   generating, by the mobile device processor, a trial template of the biometric input based on receiving the biometric input at the mobile device biometric sensor;
   identifying, by the mobile device processor, a memory domain, from a plurality of memory domains within a secure memory of the mobile device, allocated to the secured biometric-enabled application of the plurality of applications,
      the memory domain being a partition, of one or more partitions in the secure memory of the mobile device, specific to the secured biometric-enabled application of the plurality of applications,
      each partition, of the one or more partitions, being allocated to a respective secured biometric-enabled application installed on the mobile device, and
      each partition, of the one or more partitions, being enabled to include two or more sub-partitions,
         a first sub-partition of the two or more sub-partitions being allocated to store a biometric template of a first user associated with the respective secured biometric-enabled application, and
         a second sub-partition of the two or more sub-partitions being allocated to store a biometric template of a second user associated with the respective secured biometric-enabled application;
   retrieving, by the mobile device processor, a biometric template of an enrolled user from the memory domain allocated to the secured biometric-enabled application of the plurality of applications,
      the biometric template of the enrolled user including information identifying the enrolled user;
   comparing, by the mobile device processor, the biometric template of the enrolled user to the trial template; and
   authenticating, by the mobile device processor, the user as an authorized user of the secured biometric-enabled application of the plurality of applications based on the comparison resulting in a match.

2. The method of claim 1, where identifying the memory domain allocated to the secured biometric-enabled application of the plurality of applications comprises:
  transmitting, via a mobile communication network, an authentication request to a sign server based on identifying the secured biometric-enabled application of the plurality of applications,
    the authentication request being a request to confirm that the secured biometric-enabled application, of the plurality of applications, is authorized to access the secure memory of the mobile device;
  receiving an authentication of the secured biometric-enabled application, of the plurality of applications, from the sign server based on the authentication request; and
  allowing the secured biometric-enabled application, of the plurality of applications, to have access to the memory domain allocated to the secured biometric-enabled application, of the plurality of applications, based on receiving the authentication.

3. The method of claim 2, wherein the authentication indicates that the secured biometric-enabled application, of the plurality of applications, is authorized, by a mobile network operator that provides service to the mobile device, to access the memory domain allocated to the secured biometric-enabled application of the plurality of applications.

4. The method of claim 2, further comprising:
  providing access to a biometric service secured application programming based on the authentication;
  determining a setting of the secured biometric-enabled application of the plurality of applications; and
  modifying, via an application programming interface, an accuracy setting, of a matcher function performed by the mobile device processor, to require an increased accuracy level of matching between the biometric template of the enrolled user and the trial template based on determining the setting of the secured biometric-enabled application of the plurality of applications.

5. The method of claim 1, further comprising:
  enrolling the user to the secured biometric-enabled application, of the plurality of applications, by:
    providing, for presentation, a prompt on a display device for the user to provide a biometric to the mobile device biometric sensor;
    obtaining an image of the biometric by the mobile device biometric sensor based on the user providing the biometric to the mobile device biometric sensor;
    generating an enrollment template specific to the user based on obtaining the image; and
    storing the generated enrollment template in the memory domain allocated to the secured biometric-enabled application of the plurality of applications.

6. The method of claim 1,
  where the secure memory of the mobile device is commonly shared with other applications.

7. The method of claim 1, where allocating the memory domain, within the secure memory of the mobile device, to the secured biometric-enabled application of the plurality of applications comprises:
  allocating, via a biometric module application programming interface, the memory domain, within the secure memory of the mobile device, to the secured biometric-enabled application, of the plurality of applications, for storing enrollment templates based on a selection of at least one of a plurality of parameters.

8. The method of claim 7, where allocating the memory domain, within the secure memory of the mobile device, to the secured biometric-enabled application of the plurality of applications further comprises:
  partitioning the secure memory to create the memory domain,
    the memory domain being reserved for use solely by the secured biometric-enabled application, of the plurality of applications, for storing biometric related information specific to the secured biometric-enabled application of the plurality of applications.

9. The method of claim 1, where the secure memory is reserved for biometric service usage and storage of one or more templates usable by biometric-enabled applications.

10. The method of claim 1, further comprising:
  uninstalling the secured biometric-enabled application, of the plurality of applications, from the mobile device based on a user confirmation input;
  deleting one or more enrollment templates from the memory domain allocated to the secured biometric-enabled application of the plurality of applications;
  removing the memory domain allocated to the secured biometric-enabled application, of the plurality of applications, from the secure memory; and
  indicating, to the user, the removal of the memory domain allocated to the secured biometric-enabled application, of the plurality of applications, from the secure memory of the mobile device.

11. A mobile device, comprising:
  a processor that is implemented at least partially in hardware to:
    identify a mobile device application as a secured biometric-enabled application based on receiving an input selecting the mobile device application for execution on the mobile device,
      the mobile device including a biometrics controller, the biometrics controller including a biometric sensor;
    present a prompt, on a display of the mobile device, for a user to provide a biometric input, to the biometric sensor, based on identifying the mobile device application as the secured biometric-enabled application;
    generate a trial template of the biometric input based on receiving the biometric input at the biometric sensor;
    identify a memory domain, within a secure memory of the mobile device, allocated to the identified mobile device application,
      the memory domain being a partition, of one or more partitions in the secure memory of the mobile device, specific to the identified mobile device application,
        each partition, of the one or more partitions, being allocated to a respective secured biometric-enabled application installed on the mobile device,
        information stored in each partition, of the one or more partitions, including a biometric template of enrolled users of the respective secured biometric-enabled application, and
        each partition, of the one or more partitions, being enabled to include two or more sub-partitions, a first sub-partition of the two or more sub-partitions being allocated to store a biometric template of a first enrolled user associated with the respective secured biometric-enabled application, and a second sub-partition of the two or more sub-partitions being allocated to store a biometric template of a second enrolled user associated with the respective secured biometric enabled application;
retrieve an enrolled template of an enrolled user from the memory domain allocated to the identified mobile device application;
compare the enrolled template to the trial template; and
authenticate the user as an authorized user of the identified mobile device application based on the comparison resulting in a match.

12. The mobile device of claim 11, where the processor, when identifying the memory domain, within the secure memory of the mobile device, allocated to the identified mobile device application, is to:
transmit, via a mobile communication network and to a sign server, an authentication request to confirm that the identified mobile device application is authorized to access the secure memory of the mobile device;
receive an authentication of the identified mobile device application from the sign server based on the authentication request; and
allow the identified mobile device application to have access to the memory domain allocated to the identified mobile device application based on the authentication.

13. The mobile device of claim 12, where the processor is further to:
indicate that the identified mobile device application is authorized by a mobile network operator, that provides service to the mobile device, to access the memory domain allocated to the identified mobile device application.

14. The mobile device of claim 11, where the processor is further to:
determine a setting of the identified mobile device application; and
modify, via an application programming interface, an accuracy setting of a matcher function to require an increased accuracy level of matching between the enrolled template and the trial template based on determining the setting of the identified mobile device application.

15. The mobile device of claim 11, where the processor is further to:
install the identified mobile device application on the mobile device prior to receiving the input selecting the mobile device application for execution on the mobile device;
launch the identified mobile device application for a first time;
authenticate the identified mobile device application, as an application that is authorized to utilize a biometric sensor module application programming interface, based on an authentication request to a sign server;
call the biometric sensor module application programming interface based on authenticating the identified mobile device application; and
allocate the memory domain in the secure memory of the mobile device to the identified mobile device application for storing biometric templates.

16. The mobile device of claim 11, where the memory domain is reserved for use solely by the identified mobile device application for storing biometric related information specific to the identified mobile device application.

17. The mobile device of claim 15, where the processor, when allocating the memory domain in the secure memory of the mobile device, is to:
allocate a memory domain in the secure memory reserved for biometric service usage,
the memory domain allocated for biometric service usage storing a plurality of templates usable by the identified mobile device application and other applications.

18. A non-transitory computer-readable medium storing instructions, the instructions comprising:
one or more instructions that, when executed by one or more mobile device processors that are implemented at least partially in hardware, cause the one or more mobile device processors to:
store at least one secured biometric-enabled application configured to allow access, to application related data, based on authentication of a biometric input to a biometric sensor of a mobile device;
facilitate an interaction of the at least one secured biometric-enabled application with a biometric module; and
partition a partitionable secure memory into a plurality of memory domains based on inputs from the at least one secured biometric-enabled application,
each memory domain, of the plurality of memory domains, being allocated to a respective secured biometric-enabled application of the at least one secured biometric-enabled application,
each memory domain, of the plurality of memory domains, being further partitionable into two or more sub-partitions,
a first sub-partition of the two or more sub-partitions being allocated to store a biometric template of a first enrolled user associated with the respective secured biometric-enabled application, and
a second sub-partition of the two or more sub-partitions being allocated to store a biometric template of a second enrolled user associated with the respective secured biometric-enabled application;
forward an instruction, via a secure biometric application programming interface and to the biometric module, based on an enrollment request from the at least one secured biometric-enabled application, to create a memory domain specific to the at least one secured biometric-enabled application in the partitionable secure memory,
the memory domain being a partition of the partitionable secure memory; generate an enrollment template from the biometric input of a user,
the enrollment template being used to authenticate the user as an authorized user of the at least one secured biometric-enabled application; and store the enrollment template in the memory domain.

19. The non-transitory computer-readable medium of claim 18, where the one or more instructions, when executed by the one or more mobile device processors, further cause the one or more mobile device processors to:
form an image of the biometric input; and
where the one or more instructions, when generating the enrollment template from the biometric input of the user, cause the one or more mobile device processors to:
generate the enrollment template based on forming the image.

20. The non-transitory computer-readable medium of claim 18, where the one or more instructions, when executed by the one or more mobile device processors, further cause the one or more mobile device processors to:
- communicate, via a mobile communication network, with a sign server;
- send a request to the sign server requesting authentication of the at least one secured biometric-enabled application; and
- receive an authentication result, via the mobile communication network, based on the request.

\* \* \* \* \*